Patented Nov. 27, 1945

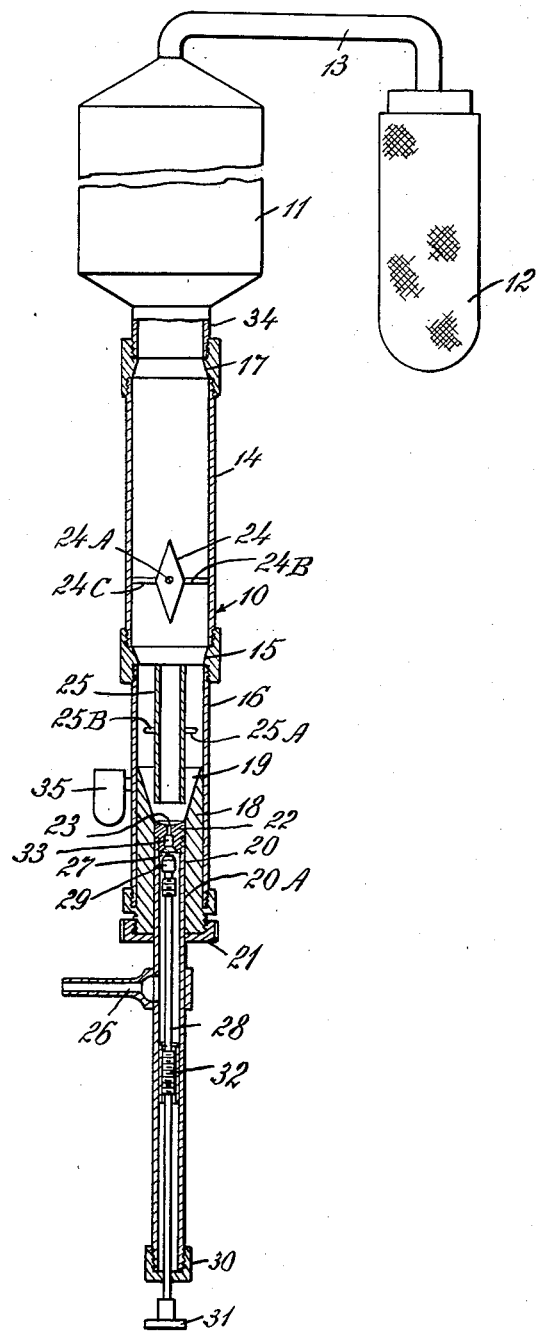

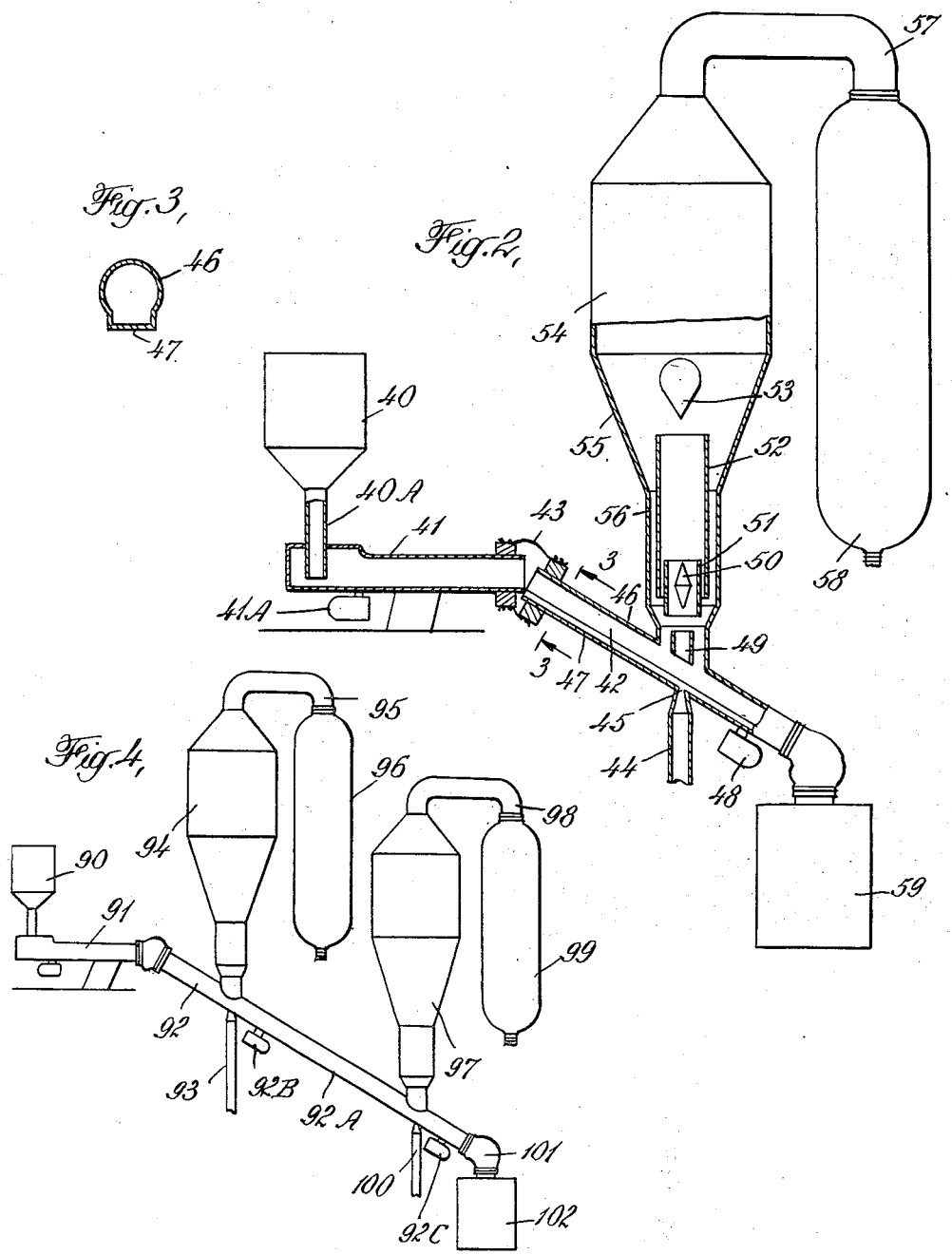

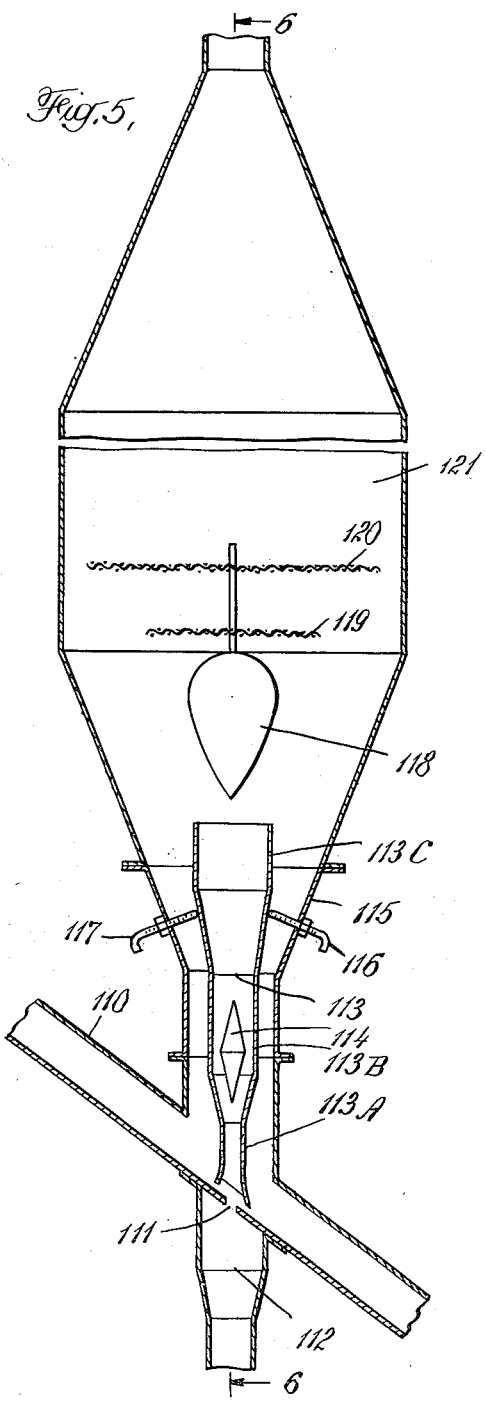
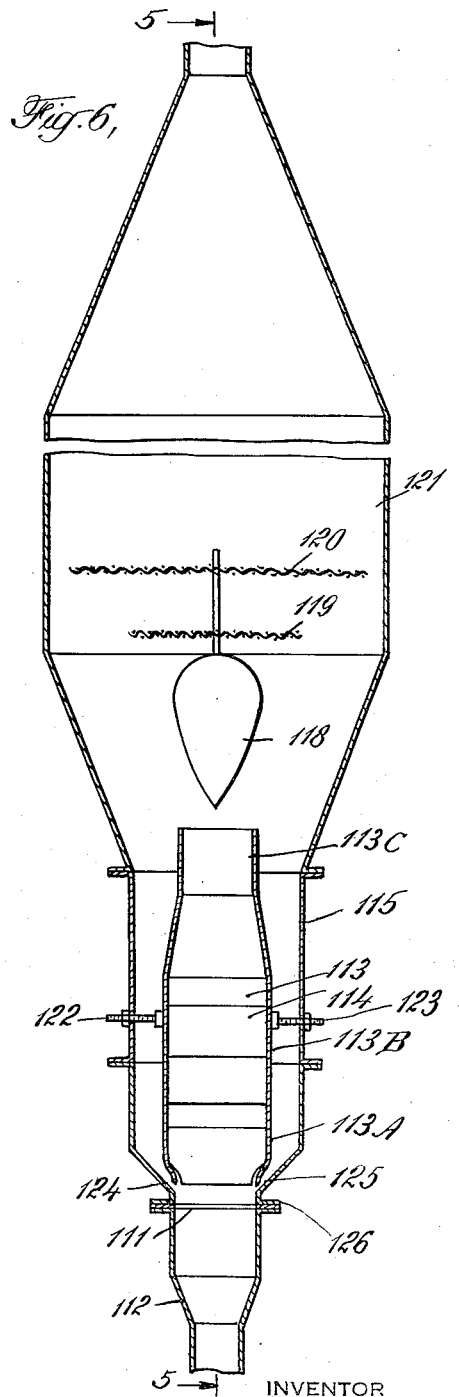

2,389,701

UNITED STATES PATENT OFFICE 2,389,701

PNEUMATIC SIZING

Edward Cushman Truesdale, Palmerton, Pa., assignor to The New Jersey Zinc Company, New York, N. Y., a corporation of New Jersey Application October 15, 1941, Serial No. 415,149

5 Claims. (Cl. 209—139)

This invention is concerned with pneumatic sizing of finely divided solids and particularly with pneumatic sizing of solids of high specific gravity and small particle size, such for example as metal powders finer than 200 mesh (74–75 microns).

It has been proposed heretofore to separate finely divided solids according to size in pneumatic classifiers of various types, but many of the classifiers available heretofore have not brought about a satisfactory separation of powders of high specific gravity and fine particle size, for example, fine zinc dust.

As the result of my investigation, I have developed an improved pneumatic classifier which may be applied to the sizing of a great variety of materials, but is particularly suitable for use in the sizing of finely divided metal powders. In general terms, my invention contemplates in pneumatic sizing apparatus for powdered material, the combination which comprises a settling chamber, an upright blowing tube disposed below and opening into the settling chamber, means for forcing a stream of gas upwardly through the blowing tube into the settling chamber, collimating means disposed in the blowing tube, an upright tapered stream-directing baffle disposed in the space comprising the blowing tube and the settling chamber and substantially concentric with the blowing tube, the lower portion of said baffle consisting of downwardly inclined smooth surfaces converging to form an acute angle sufficiently sharp that said baffle functions substantially only as a deflector for said stream, means for introducing powdered material to be sized into the blowing tube, means for withdrawing a fine fraction of the material in gaseous suspension from the settling chamber, and means for vibrating the blowing tube.

The term "collimating" is used herein to describe the means employed to render the flow of gas currents and entrained particles in the blowing tube parallel in analogy to the action of an optical collimator in producing a parallel beam of light. In preferred forms of my apparatus the "collimating" means or "collimator" is a tube open at both ends and disposed within the blowing tube substantially concentrically with it and with the tapered stream-directing baffle. The collimator causes substantially all of the entrained particles to move vertically so as to strike the baffle and thence to rebound toward the outside walls of the apparatus. The wall of this tube may also serve as a partition between ascending and descending streams of particles in the blowing tube and assures that even the largest particles in the feed are carried into the settling chamber.

One form of my apparatus that is particularly adapted for laboratory use in making accurate particle size analyses of very fine material comprises an upright blowing tube having an upper tubular portion and an interconnected substantially concentric lower tubular portion smaller in cross-section than the upper tubular portion, a downwardly tapered stream-directing baffle disposed substantially centrally in the upper tubular portion with an annular space between the baffle and the wall of the upper tubular portion, the lower portion of said baffle consisting of downwardly inclined smooth surfaces converging to form an acute angle sufficiently sharp that said baffle functions substantially only as a deflector for said stream, an orifice in the bottom of the lower tubular portion, means for forcing a stream of gas upwardly out of said orifice into the lower tubular portion, a collimator tube of cross-section substantially less than that of the lower tubular portion disposed substantially concentrically therein and extending upwardly from a point above the orifice to a point below the point of the baffle, said tube being open with a substantial open annular space between it and the wall of the lower tubular portion, means for introducing finely divided solids to be classified into the lower tubular portion, means for vibrating the blowing tube, a settling chamber mounted above the upper tubular portion of the blowing tube and communicating therewith, and means for withdrawing solids suspended in gas from the settling chamber.

In my apparatus just described, the minimum annular cross-sectional area between the baffle and the wall of the upper tubular portion is substantially equal to the cross-sectional area of the lower tubular portion. Both portions may be cylindrical. The downwardly tapered pointed baffle is conveniently in the form of an inverted cone, and may also have a conical or rounded top portion, so that the baffle tapers in both directions from a mid-section of relatively large cross-section.

The orifice in the bottom of the lower tubular chamber should be centrally disposed with respect to the inner or collimating tube and is conveniently placed at the bottom of a hopper which forms the lower end of the lower tubular portion of the blowing tube. The baffle, in the preferred form of my apparatus, is disposed in the lower end of the upper tubular portion of the blowing tube, and the collimator tube extends from a point just above the orifice to a point just below the bottom of the baffle.

As indicated above, the upper tubular portion is larger in cross-section than the lower tubular portion. Preferably, the two are connected together by a tapered tube or union.

In larger apparatus adapted for continuous feed and discharge, the relationship of collimator and baffle may be somewhat different, but these and other features of my invention will be more thoroughly understood in the light of the following detailed description taken in conjunction with the accompanying drawings in which:

Fig. 1 is an elevation, partly in section, of one form of the apparatus of my invention particularly adapted for laboratory use in making sizing analyses;

Fig. 2 is an elevation, partly in section, of another form of the apparatus of my invention that is particularly adapted for sizing of relatively large quantities;

Fig. 3 is a section taken through the apparatus of Fig. 2 along the line 3—3;

Fig. 4 is an elevation illustrating the manner in which a plurality of the classifiers of the type shown in Fig. 2 may be connected and employed in series; and Figs. 5 and 6 illustrate a further modification of the apparatus of Figs. 1 and 2.

Referring now to Fig. 1, it will be observed that the apparatus comprises a blowing tube 10 disposed below and connected with a settling chamber 11. Apparatus for collecting solids 12, preferably a double weight paper extraction thimble or fused alumina thimble, is connected to the top of the settling chamber by means of a tube 13.

Referring now to the blowing tube, it will be observed that it comprises an upper tubular portion 14 of cylindrical cross-section connected by means of a tapered union 15 to a lower tubular portion 16 of smaller but cylindrical cross-section. The upper portion of the blowing tube is connected at its top to the settling chamber by means of a union 17.

A hopper member 18 is fitted into the bottom of the lower tubular portion of the blowing tube. This member has a conical recess 19 in its upper end that served as a hopper in which a sample of powder to be sized is placed. The hopper member also has a concentric bore 20 into which an air-pipe 20A is fitted, and it is held in the bottom of the blowing tube by means of a cap or bushing 21 which has a hole in it through which the air-pipe passes in a tight joint. The upper end of the air-pipe is provided with a concave tip 22 having a small central orifice 23. The tip is threaded into the air-pipe and its concave upper surface joins the sides of the hopper in a smooth contour.

An upright stream-directing baffle 24 comprising a pair of cones joined at their bases is disposed concentrically in the lower end of the upper portion of the blowing tube immediately above the tapered union 15. The downwardly converging sides of the baffle form an acute angle. The baffle is held in position by a plurality of supporting rods 24A, 24B, 24C.

A collimator tube 25 is disposed in the lower portion of the blowing tube. The collimator tube has a diameter substantially less than that of the lower portion of the blowing tube and conveniently may have a diameter about ⅓ that of the lower portion. The collimator tube is open at both ends and is supported by a plurality of supports 25A, 25B, which extend horizontally from the outside of the collimator tube to the walls of the blowing tube. Longitudinally the collimator tube extends from a point just above the orifice to a point just below the lower end of the baffle.

Air or other gas adapted to bring about suspension of the powder in the apparatus is admitted into the air tube through a T 26. Admission of the air to the blowing tube through the orifice is controlled by means of a valve 27 having a long stem 28 extending from a valve plug 29 out through the lower end of the air tube. The lower end of the air tube is closed by means of a friction cap or bushing 30 through which the valve stem passes to a control knob 31. A sleeve 32 through which the valve stem is threaded is disposed inside the air tube below the T. As the knob is twisted, the plug 29 is moved up and down with respect to a valve seat 33 in the bottom of the tip 22.

As noted above, the tip 22 of the air tube is detachable, i. e., threaded, and it is desirable in laboratory apparatus to provide a series of interchangeable tips having orifices of different diameters, say, of 1, 2, 3 and 4 millimeters, respectively. The lower surfaces of these tips are machined to form the air-tight seat 33 for the machined upper surface of the plug 29 on the valve stem. The lower surface of the plug is in turn machined to make an air-tight contact with the upper end of the threaded sleeve 32 when the valve stem is in its lowest position.

In the laboratory apparatus just described, the lower tubular portion of the blowing tube conveniently has an internal diameter of about 1-inch. The conical stream-directing baffle is mounted with its lower tip a short distance, say, about one-quarter of an inch above the top of the collimator tube.

The upper portion of the blowing tube is larger in cross-section than the lower portion, the difference in diameter being such that the cross-sectional area of the minimum annular space between the upper portion of the blowing tube and the baffle is about equal to the cross-sectional area of the lower portion of the tube. An upper tube 34 which connects the blowing tube to the settling chamber via the upper union may be the same diameter as the tube 14 or slightly smaller.

Because of the relationship between the rate of air flowing in the settling chamber and the diameter of particles being subjected to classification as given by Stokes' law, it is desirable to provide a series of demountable settling chambers having diameters in the proportions of 1:2:4:8, etc. By changing from one to another of these settling chambers, it is possible to make a series of separations of particles finer than, say, 5, 10, 20 and 40 microns with the same rate of air flow for each separation. For example, settling chambers of respectively 1", 2", 4" and 8" diameters may be provided. In such case, the settling chamber of 1-inch diameter is a simple tube which is threaded into the upper union when in use. Conveniently, all of the settling chambers may have cylindrical sections at least 12-inches high, the lower frusto-conical sections of these tubes being about 10-inches high. In this way, a steep-sided wall is provided for facilitating return of solids from the settling chamber to the region of the air blast in the bottom of the blowing tube.

The upper frusto-conical section of the settling chambers may be about 3-inches high with short sections of one-inch tubing fastened at their upper ends.

Means are provided for vibrating the blowing tube of the apparatus of Fig. 1, preferably transversely to its major axis. This may be done with a conventional electrical vibrator 35 clamped to the blowing tube 16 in the neighborhood of the hopper. The vibrator may, if desired, be clamped to the tube 14.

In the operation of the laboratory apparatus just described for sizing metal powders, it is desirable to employ a sample of about 25 grams. This sample is placed in the hopper with the valve closed. The settling chamber is then threaded on the top of the blowing tube and an air-line is connected to the T with the electric vibrator clamped to the lower portion of the blowing tube. The air-line is provided with a conventional flow meter, pressure gauge and needle valve (not shown). When the needle valve is open the air pressure builds up in the air tube below the orifice. The needle valve should be opened far enough to build up in the air-pipe below the orifice a pressure sufficient to cause the flow upward with a velocity sufficient to prevent any particles of the sample from falling through into the air tube when the valve is opened.

When the pressure in the air tube is sufficient, the valve in the air tube is dropped to its lowest position and seated on the threaded sleeve 32. Thereafter, the flow of air to the orifice is regulated by means of the needle valve and the vibrator is started.

A jet of air flows upward out of the orifice at the bottom of the hopper and entrains particles of the sample which are brought into the path of the jet by gravity flow aided by vibration of the tube. The air jet has a high velocity and it carries the particles of the sample up through the inner collimator causing them to impinge upon the baffle. The particles strike the baffle at an angle such that they glance outwardly.

The air jet rapidly loses velocity as it leaves the upper end of the inner tube, with the result that the largest particles and some of the fines after striking the baffle and perhaps rebounding from the surface of the upper portion of the tube fall back into the main body of the sample in the hopper and are recirculated. The finer particles impinging upon the baffle are, in large part, carried upward into the settling chamber with more or less impingement and rebounding from the surface of the upper portion of the blowing tube.

In the settling chamber, the velocity of the air jet is rapidly dissipated and final separation of the powder occurs there. Particles too coarse to be floated out of this chamber fall downwardly, and, aided by vibration, are directed back into the blowing tube passing outside the collimator tube into the hopper. Particles fine enough to remain suspended are carried out of the settling chamber and collected in the collection means, e. g., a paper thimble.

When a settling chamber having a large diameter is employed so that it has a frusto-conical lower portion which connects it with the blowing tube, it may be desirable to supplement the effect of the vibrator by tapping the settling chamber at intervals. Conveniently, the tapping may be done with a rubber-covered rod.

Frictional effects encountered in blowing powdered materials in the apparatus may impart electrical charges to the particles. With metallic particles, this charge is not particularly serious in its effect because the particles rapidly lose their charge upon contact with the metal walls of the settling chamber. It may, however, be desirable to ground the walls of the settling chamber.

Non-metallic particles may retain charges for a long time and this may cause them to adhere firmly to the wall of the settling chamber and require excessive vibration to shake them loose. Adherence of particles to the apparatus may be prevented at least in part by thoroughly drying the sample and employing dry air in blowing.

Operation of the apparatus is continued until all the particles finer than a given size have been separated from the sample and collected in the filter, where their weight is determined by difference.

Correction may be made for sub-size particles which may have adhered to the wall of the settling chamber and thus have failed to reach the filter, by weighing both the coarse residue and the separated fines.

In stopping the operation, the vibrator is first shut off, then the valve 27 is closed before the air flow has been reduced to a point at which particles of the sample could fall through the orifice 23.

The operation of the apparatus is based upon Stokes' law, which relates the velocity of a freely falling spherical particle to its diameter and density and to the density and viscosity of the fluid through which the particle falls. Strictly speaking, the dominant factor is the difference in density between the particle and the medium through which it falls, but for classification of most solid particles in air, the density of the latter may be neglected. Stokes' equation is:

$$V = \frac{10^{-8} g \rho d^2}{18 \eta}$$

where $V$ = velocity of fall in cm./sec. in still air
$g$ = gravitational constant, 980 cm./sec./sec.
$\rho$ = density of particle in gm./cc.
$\eta$ = viscosity of air, $1.82 \times 10^{-4}$ poise at 20° C.
$d$ = diameter of spherical particle in microns (1 micron = $10^{-4}$ cm.)

Thus, at 20° C. in air, $$V = 29.91 \rho d^2 \times 10^{-4}$$

In theory, if air is moving upward in a vertical tube at a uniform rate, spherical particles which would fall in still air at this same rate will remain suspended, smaller particles will be carried upward by the air stream; and larger particles will continue to fall. In practice, this ideal behavior is not obtained because of lack of uniformity of air-flow caused either by turbulence or by retarded flow along the wall of the tube, and because particles of many materials are far from spherical and are floated as if they possessed an "effective" spherical diameter which is different from their actual dimensions. Moreover, as indicated above, particles may be electrically charged and thus may adhere to the tube wall.

The apparatus of my invention overcomes, in large measure, the difficulties which flow from these factors, and the apparatus is capable of extremely accurate classification. Thus, with samples weighing 20 to 25 grams, separation at a given particle size may be brought to about 99 per cent of completion in a blowing period of 20 to 120 minutes, depending upon the size at which separation is made and the percentage of material finer than this size in the sample. The finer sizes require the longer times, and in general 60 to 70 minutes will suffice. Moreover, the apparatus successfully separates metallic powders in a range beginning at 2-3 microns and extending upward to, say, 75 microns, provided that there are some coarse particles which recirculate in the blowing tube. In general, with metallic powders, it is possible to make an accurate separation of all particles larger than 5 microns from all particles smaller than 5 microns.

The accuracy of separation obtained with this apparatus as determined by microscopical examination in the finer sizes and screen analyses in the coarser sizes, is very high up to particle diameters of 40-50 microns, substantially no oversize particles being carried over to the filter. Separations at larger sizes tend to be somewhat less accurate, in that a small percentage of oversize particles may be found in the fine fraction. The results obtainable are reproducible, however, even at the larger sizes.

Referring now to Fig. 2, it will be observed that, in general, the apparatus is similar to that of Fig. 1. However, the apparatus of Fig. 2 is intended for the treatment of larger quantities and for continuous operation. Thus, in this apparatus, the material to be sized (say zinc dust) is removed from a feed hopper 40 by a vibration feeder 41 which may be of any conventional construction, say, of the Trayco type. The feeder is essentially a trough which is vibrated by means of a vibrator 41A. The rate of feed is determined by the clearance between the delivery tube 40A of the hopper and the bottom of the trough of the feeder and also by the intensity with which the feeder is vibrated. The zinc dust leaving the feeder slides down through an inclined feed trough 42 which is coupled to the vibrating feeder by a flexible connection 43. As the zinc dust slides down the feed trough, it encounters a vertical air jet projected upwardly from an air-pipe 44 provided with a small orifice 45 in the bottom of the trough.

In cross-section, the feed trough is shaped as shown in Fig. 3. In one instance, a satisfactory feed trough was made of a piece of 2-inch brass pipe from which a strip had been cut out and replaced by a ⅞-inch wide brass channel which was brazed to the pipe. Thus, as shown in Fig. 3, the feed trough had a cylindrical upper section 46 and a rectangular lower section 47. This particular trough was sloped at an angle of 30° to the horizontal.

The orifice or nozzle 45 conveniently may consist of an insert flush with the feed trough having a narrow slot reaching from wall to wall of the feed trough and delivering a vertical stream of air. To vibrate the feed trough 42 and to insure a uniform flow of zinc dust through the feed trough an electrical vibrator 48 is provided with a rapper which impinges upon the bottom of the trough.

If the air jet has a sufficient velocity all of the zinc dust which slides down the trough together with some aspirated air will be carried upward by the air jet through a collimating tube 49 and impinge upon a cylindrical double conical stream-directing baffle 50 which in turn is disposed in a second collimating tube 51. The tube 51 is open at both ends as is the collimator tube 49.

Particles passing the double conical baffle through the tube 51 are then carried through a third tube 52 which is concentrically disposed around the tube 51 and extends above it substantially. Particles passing through the tube 52 impinge upon a baffle 53. The blowing tube in this form of the invention comprises an upper outwardly formed portion 55 and a lower cylindrical portion 56 that extends downwardly to the feed trough 42 and encloses the elements 49, 50, 51 and 52. The baffle 53 is supported in spaced relation above the collimating tube 52 and inside the blowing tube.

Particles which are finer than the size at which separation is being made, i. e., particles fine enough to remain in suspension in the apparatus, are carried out of the settling chamber through a pipe 57 into a conventional bag filter 58. The diameter of the pipe 57 is small enough to impart a relatively high velocity to the gas leaving the settling chamber and thus prevent settling in the pipe.

The coarse particles and some of the fine particles are returned by gravity to the feed trough through the space between the tube 52 and the cylindrical portion 56. Approximately half of the material falling back from the settling chamber returns up-stream from the blowing nozzle and will be recirculated, the other half returning down-stream and being discharged to a residue hopper 59.

The residue hopper is connected to the feed channel or trough by a flexible air-tight connection similar to that connecting the vibrating feeder and the feed hopper and the vibrating feeder and the feed trough.

The apparatus may be constructed without the tube 52. However, this is not recommended when the apparatus is designed to handle large quantities of material fed continuously, because without the tube 52 the returning material tends to choke the rising air stream intermittently. It will be observed that the position of the tube 52 in the apparatus provides separate channels for the rising and falling streams of material.

The tubes 49 and 51 may be made integral, i. e., connected together by a frusto-conical section. However, separate tubes facilitate the task of converting the high velocity air stream issuing from the nozzle into the uniformly slow moving stream required in the settling chamber in order to obtain proper sizing. If the tubes 49 and 51 are made integral, it is desirable to provide for more baffling effect in the region of the baffle 53.

The baffle 53 serves a plurality of purposes. It prevents returning dust from interfering with the ascending stream and with this in view a solid baffle is desirable. Another function of the baffle is to spread the high velocity air jet and to produce as quickly as possible in the settling chamber an air stream having a uniform velocity from wall to wall. A variety of baffles have been employed with the view to improving the operation of the apparatus and it has been found that the top-shaped baffle advantageously may be supplemented by a system of horizontal grids made of coarse screen wire. Referring to Fig. 4, it will be observed that two separators of the type illustrated in Fig. 2 are employed in series. Thus, material from a feed hopper 90 is conveyed by vibrating feeder 91 to an inclined feed trough 92. The material sliding down the feed trough encounters a rising high velocity jet from the pipe 93 and is forced up into a separator 94 which is constructed as shown in detail in Fig. 2. This separator has an outlet pipe 95 at its top which connects with a filter bag 96. Coarse material which returns to the feed trough after classification in the separator 94 is conveyed downwardly into a continuation 92A of the feed trough to a second separator 97, which is similar in construction to the separator 94 and is provided with an outlet pipe 98 and a filter bag 99.

A plurality of electrical vibrators 92B, 92C are provided on the feed trough for moving the material to and from the separator. These also serve to vibrate the blowing tubes of the separators. With separators arranged in series as in Fig. 4, vibrators may or may not be required on the feed trough of separators after the first, depending upon the characteristics of the powder being classified.

The second separator is provided with an air-pipe 100 which supplies a jet of high velocity air to the separator as described in the case of the first separator 94.

Coarse material passing through both separators is passed through a flexible air-tight connection 101 to a residue hopper 102.

In operating classifiers constructed according to the principles of this invention, it has been found that the material first collected in the filter is appreciably finer than the particle size at which separation is being made, and that only with recirculation is this size limit approached. This effect is illustrated by data to be given hereinafter, and advantage may be taken of it in several ways. Thus, in the apparatus of Fig. 4, each of a series of separators, each using the same rate of air flow, may be caused to discharge fines into separate filter bags. In this case the size distribution will vary from bag to bag, but in no case will the maximum size of separation be exceeded. Or, the separators may all be made to discharge fines into a common filter system, an arrangement which facilitates the maintenance of identical air flow in each separator. Or, it may be determined by trial to what extent the first few stages may be operated with air in excess of the theoretical blowing rate without exceeding the desired particle size limit, thus increasing the rate of separation in these stages, and returning to normal conditions in later stages. In general, however, because the feed troughs 92, 92A, etc., serve as a common air duct, and because severe aspirating effects may exist near the nozzles, it is preferable to operate all stages at substantially the same air flow.

A modified form of the apparatus of Figs. 1 and 2 is illustrated by Figs. 5 and 6 which are vertical sections taken through the apparatus at right angles to each other. Thus, Fig. 5 is a vertical section taken along the line 5—5 of Fig. 6, and Fig. 6 is a vertical section taken along the line 6—6 of Fig. 5. Referring to Figs. 5 and 6, finely divided material (say zinc dust) to be sized is introduced into the apparatus through an inclined trough 110 having a flat inclined bottom which makes a 55° angle with the vertical. The dust is moved down the trough under the influence of a vibrator (not shown) and encounters a high velocity jet of air from a long narrow slot 111 in the bottom of the trough with its major axis across the trough, and equal in length to the width of the trough. In the apparatus of Figs. 5 and 6, this slot length was 4 inches. The jet of air is fed from an air chamber 112 underlying the trough. The dust striking the jet is driven upward through an upright collimator tube 113 having a lower section 113A that is relatively narrow, a second and mid-section 113B that is somewhat wider, and a top section 113C which is wider still, as viewed in Fig. 5. The lower section and the mid-section are rectangular in plan and the upper section is circular. As shown in Fig. 6, the lower section and the mid-section are of approximately the same width measured transversely to the trough.

In the mid-section 113B of the tube is disposed a stream-directing baffle 114 which comprises double wedges joined at their bases so that the baffle tapers both upwardly and downwardly.

The tube 113 is held in position in a blowing tube 115 by means of supporting screws 116, 117 and 122, 123. Thus, tube 113 may be adjusted transversely by 122, 123 and may be rotated slightly about 122, 123 as an axis by means of 116, 117. This permits accurate alignment of the lower end 113A and the nozzle 111. The lower end of 113A should preferably be not more than ½" above the nozzle 111, for otherwise the high velocity air jet, making unequal angles with the base of the feed trough on either side of the nozzle may be diverted from its vertical direction in consequence of unequal pressures generated by the aspirating effect of the jet. Likewise, the lower end of tube 113A is flared transversely, as shown in Fig. 5, to prevent deflection of the air jet.

The lower portion 113A of the collimator tube is tapered transversely, as viewed in Fig. 6, to permit it to fit into the blowing tube where the latter joins the feed trough 110, but at the narrowest point of the taper tube 113A remains slightly wider than the length of the slot nozzle 111. The blowing tube 115 has a vertical portion 124 and 125 just above the flange 126. The purpose of this vertical portion, which may extend for about ¼ inch above the flange is to prevent transverse divergence of the air jet.

The tube 113A should not come in contact with the blowing tube 115 at its lower end in order to prevent accumulations of metallic dust at that point.

Immediately above the open end of the tube 113 there is disposed a top-shaped stream directing baffle 118. This baffle is circular in plan and is disposed with its point down, the downwardly converging sides forming an acute angle. Two screen grids 119, 120 are disposed horizontally above the baffle 118 in a settling chamber 121.

The settling chamber, including the frusto-conical sections, and the elements therein are all circular in plan. The blowing tube is rectangular in plan as are the lower and midsections of the collimator tube, there being a transition from the rectangular to the cylindrical shape near the top of the upper portion of the collimator tube.

The classifier of Figs. 5 and 6 is capable of accurate separation of particles varying in size from 5 to 40 microns and can be used successfully up to at least 75 microns (200 mesh) although a small percentage of oversize may be present in the fines as the upper size limit is approached.

To permit a wide range of separation, settling chambers of various diameters may be used with their corresponding theoretical rates of air flow. In order to maintain the desired nozzle pressure at various rates of air flow, interchangeable nozzles of varying slot widths may be used. In operating with metal dusts, it was found that settling chambers 8", 16" and 24" in diameter, and nozzles of 0.025, 0.045 and 0.090" width were sufficient to cover the entire range of separation.

The apparatus of Figs. 5 and 6 was found to require air supplied to the blowing nozzle at about 4 pounds per square inch pressure when a feed rate of 5 pounds per minute of metal dust was maintained. The nozzle pressure is not critical but sufficient energy must be available to raise all of the feed material up into the settling chamber without allowing any unblown material to pass the blowing nozzle. Air from a multiple stage turbine capable of delivering air at a pressure up to five pounds per square inch is suitable.

Experiments have shown that humidity of the air has no effect on the classification of metal powders, air with relative humidities of 13% to above 90% having been used with success. Moreover, ordinary changes in temperature such as are encountered in the atmosphere have no noticeable effect on the accuracy of classification.

It has been found that the percentage of recoverable fines which can be recovered at each pass decreases with increasing feed rate. The optimum feed rate is fixed by the point at which this effect becomes very marked, and may differ somewhat with materials of different size distribution.

This relationship between feed rate and recovery is believed to be the cause of an important difference between the results obtainable with a multiple stage classifier and with a single stage classifier in which the same number of passes is obtained by recirculation. For in the data to be presented relative to single stage operation, the same feed rate was used at each pass, while with a multiple stage classifier the feed rate necessarily decreases from stage to stage. This would be expected to result in relatively higher recoveries during the latter stages of multiple stage operation or, conversely, would permit a higher initial feed rate.

An angle of 35° from the horizontal in the feed trough is sufficient to impart continuous motion to many metal powders on a smooth brass or steel surface. However, to insure steady flow and uniform distribution of the finer powders, a vibrator attached to the feed trough is desirable. Increasing the slope of the feed trough much above 35° tends to cause the powder to flow too rapidly, and in the case of a multiple stage unit, would increase unnecessarily the overall height of the apparatus.

The following are examples of the results obtained in the treatment of various metal dusts with the apparatus of Figs. 5 and 6. In all cases, the metal dust was fed to the apparatus at the rate of 5 pounds per minute. The collection system for recovering the fines included a rough collector, which was a 24" diameter cyclone, followed by a pair of filter bags. The cyclone was used to relieve the load which would otherwise be placed on the bags.

EXAMPLE

The zinc dust composed of spherical particles and having the size distribution shown in Table I was recirculated for a total of 10 passes. The air flow in the apparatus was that required theoretically for 20-micron separation in a 16" diameter settling chamber 40" high. The fines obtained at each pass were separately weighed and analyzed. The composition of the combined fines from the 10 passes is given in Table I (Sample No. 276A).

Another batch of the same zinc dust was classified for a total of 10 passes, an air-flow equivalent to 30-micron separation being used in the same settling chamber. The composition of the products obtained by combining the fines from the first six passes and from all the passes are shown in Table I, Samples 275A, 275B, respectively.

Results of operations with the same zinc dust employing a shorter settling chamber, i. e., one 26" high, are shown in Table I, Samples 273A, 273B, 273C.

TABLE I

*Preparation of classified zinc dust samples*

| Sample No. | Method of preparation | | | Per cent by weight in each micron size range for cumulative product | | | | | Cumulative −20 micron grade | Recovery of feed in fines |
|---|---|---|---|---|---|---|---|---|---|---|
| | Equivalent air flow | No of passes incl. | Length of settling chamber | 0-10 | 10-20 | 20-30 | 30-40 | +40 | | |
| | *Microns* | | *Inches* | | | | | | *Percent* | *Percent* |
| 276-A | 20 | 10 | 40 | 93.8 | 6.1 | 0.04 | | | 99.96 | 70.5 |
| 273-A | 30 | 4 | 26 | 91.9 | 7.7 | 0.3 | 0.1 | | 99.6 | 53.8 |
| 273-B | 30 | 6 | 26 | 85.6 | 13.0 | 1.2 | 0.2 | 0.03 | 98.6 | 75.5 |
| 273-C | 30 | 10 | 26 | 81.2 | 16.3 | 2.1 | 0.4 | 0.05 | 97.5 | 85.8 |
| 275-A | 30 | 6 | 40 | 90.7 | 9.2 | 0.06 | 0.05 | | 99.9 | 65.8 |
| 275-B | 30 | 10 | 40 | 84.4 | 15.3 | 0.2 | 0.1 | 0.02 | 99.7 | 80.8 |
| L-1811—Original zinc dust | | | | 70.4 | 18.3 | 4.8 | 4.0 | 2.5 | 88.7 | |

It will be observed from Table I that the −20 micron grade of the product obtained by using 30-micron air flow is improved when a longer settling chamber is used, but at the expense of recovery. It will also be noted that the recovery is increased by going from 20- to 30-micron air flow with only a small decrease in the 20-micron grade of the product.

The variation in grade from stage to stage is shown in Table II which is based on data obtained in classification of Sample 273A, 273B and 273C employing 30 microns air flow.

TABLE II

*Classification of zinc dust with 30-micron[1] air flow*

| Pass No. | Per cent total feed in fines | Per cent by weight in each micron size range | | | |
|---|---|---|---|---|---|
| | | 0-20 | 20-30 | 30-40 | +40 |
| 1 | [2]18.6 | 99.5 | (0.5) | | |
| 2 | [2]14.8 | | | | |
| 3 | 9.8 | | | | |
| 4 | 10.6 | 99.6 | (0.4) | | |
| 5 | 13.7 | | | | |
| 6 | 8.0 | 94.9 | 4.4 | 0.7 | |
| 7 | 4.0 | | | | |
| 8 | 3.2 | 89.5 | 9.0 | 1.4 | 0.1 |
| 9 | 2.1 | | | | |
| 10 | 0.9 | 81.1 | 16.7 | 2.1 | 0.1 |
| Total | 85.8 | | | | |

[1] With a 16" diameter settling chamber, this air flow is 53.6 cubic feet per minute.
[2] 2.5 per cent of the feed collected in the filter bag and was divided between the first two passes.

I claim:
1. In pneumatic sizing apparatus, the combination which comprises an upright structure including a blowing tube, a settling chamber, means for the discharge of sized fine solid particles from the top of the settling chamber, a collimating tube in the blowing tube providing an upright space between the blowing tube and the collimating tube, means for charging solid particles in a stream of gas into and through the collimating tube, the collimating tube having openings at the top and the bottom communicating with the upright space, and a tapered stream-directing baffle disposed in the blowing tube and directly above the collimating tube, the lower portion of said baffle consisting of downwardly inclined smooth surfaces converging to form an acute angle sufficiently sharp that said baffle functions substantially only as a deflector for said stream, the space in the settling chamber being directly above the baffle, contiguous with the space in the upper part of the blowing tube and characterized by an unobstructed continuous upright open space providing for the upward flow of gas directly above the baffle and for the return downward of relatively heavy solid particles from the settling chamber through the space around the baffle and in the blowing tube.

2. Pneumatic sizing apparatus according to claim 1 which comprises at least one horizontally disposed screen grid directly above the baffle and in the settling chamber which suppresses the turbulence of the gas flowing above the baffle.

3. Pneumatic sizing apparatus according to claim 1 which comprises a tapered baffle in the collimating tube.

4. Pneumatic sizing apparatus according to claim 1 which comprises a second collimating tube shorter than, and disposed inside of, the first-mentioned collimating tube.

5. In pneumatic sizing apparatus for finely divided solids, the combination which comprises a blowing tube disposed substantially vertically, a stream-directing baffle disposed substantially coaxially in said tube, the lower portion of said baffle consisting of downwardly inclined smooth surfaces converging to form an acute angle sufficiently sharp that said baffle functions substantially only as a deflector for said stream, an orifice in the bottom of the blowing tube, an inner thin walled collimating tube of cross-section substantially less than that of the blowing tube disposed substantially centrally therein and extending upwardly from a point above the orifice to a level below the level of the baffle, said collimating tube providing a substantial open annular space between it and the wall of the blowing tube with openings at the top and bottom of the space connecting with the inside of the collimating tube, means for introducing finely divided solids to be classified into the blowing tube, means for forcing a stream of gas upwardly out of said orifice into the blowing tube to carry upward the particles of solids, means for vibrating the blowing tube, a settling chamber the exterior walls of which are above the upper portion of the blowing tube and connected therewith, the space in the chamber and in the upper portion of the blowing tube being contiguous and providing a continuous upright open space for the flow of particle-laden gas around and directly above the baffle and for the return of large particles downward from all parts of the chamber into the blowing tube, and means for withdrawing sized solid particles suspended in the gas from the upper portion of the settling chamber.

EDWARD CUSHMAN TRUESDALE.